(12) United States Patent
Vahdat et al.

(10) Patent No.: US 8,355,630 B1
(45) Date of Patent: *Jan. 15, 2013

(54) POLARITY INVERSION DETECTION FOR AN OPTICAL CIRCUIT SWITCH (75) Inventors: Amin Vahdat, Los Altos, CA (US); Leon Poutievski, Santa Clara, CA (US); Shashidhar Gandham, Fremont, CA (US)

(73) Assignee: Google Inc., Mountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,667

(22) Filed: May 18, 2012

Related U.S. Application Data (63) Continuation of application No. 13/303,975, filed on Nov. 23, 2011.

(51) Int. Cl.
*H04B 10/08* (2006.01)
(52) U.S. Cl. .............. 398/19; 398/12; 398/9; 398/17; 398/45
(58) Field of Classification Search ............ 398/9–19, 398/45
See application file for complete search history.

(56) References Cited

U.S. PATENT DOCUMENTS

| 5,170,113 | A | * | 12/1992 | Albonesi ................. 324/66 |
| 7,293,076 | B2 | * | 11/2007 | Soetemans .............. 709/220 |
| 2001/0038471 | A1 | * | 11/2001 | Agrawal et al. .......... 359/110 |
| 2003/0137934 | A1 | * | 7/2003 | Schaller et al. .......... 370/227 |
| 2006/0153562 | A1 | * | 7/2006 | Dolbec et al. ............ 398/20 |
| 2009/0089594 | A1 | * | 4/2009 | Cagno et al. ............ 713/300 |
| 2010/0322554 | A1 | * | 12/2010 | Barnes et al. ........... 385/24 |
| 2011/0209082 | A1 | * | 8/2011 | Conzola et al. .......... 715/771 |

* cited by examiner

*Primary Examiner* — Li Liu
(74) *Attorney, Agent, or Firm* — Foley and Lardner LLP; John D. Lanza (57) ABSTRACT

A system and method of detecting polarity inversion in an optical switching circuit is disclosed. The method includes performing a first round of a port verification process on at least two optical ports, transmitting a payload from at least one optical port in the at least two optical ports, determining if the payload was received at a second optical port in the at least two optical ports, assigning a pair of ports to a first group in the case that the predetermined payload was communicated between the pair of ports, and assigning a pair of ports to a second group in the case that the predetermined payload was not communicated between the pair of ports. The method also includes determining that either the first group of ports or the second group of ports has inverted polarity.

22 Claims, 5 Drawing Sheets

POLARITY INVERSION DETECTION FOR AN OPTICAL CIRCUIT SWITCH

CROSS-REFERENCE TO RELATED APPLICATIONS

The present application is a Continuation of U.S. patent application Ser. No. 13/303,975 filed Nov. 23, 2011. U.S. patent application Ser. No. 13/303,975 is incorporated by reference herein in its entirety.

BACKGROUND

Data centers are used to provide switching and interconnection of data transmitted and received across the internet. In current data center deployments, the topology of the various data paths are predetermined. The predetermined topology is listed in a configuration file in order to have a record of the various cabled topology connections. Communication cables used to carry internet data must be manually installed into such data centers. However, errors in installing communication cables occur, resulting in failed communication at the data center between hosts such as servers, between electrical packet switches (EPS) or between a host and an EPS, for example.

Accordingly, current data centers verify the connection of communication cables to the data center using a discovery protocol. For example, if the configuration file states that a host is connected to port 1 out of 20 ports in a data center, then it is sufficient to verify that data should be received from port 1 in the data center when data is transmitted to that port from a location as stated in the configuration file. Similar verification can be performed for communication cables connecting switches at the data center.

In emerging data center architectures, Optical Circuit Switches (OCS) are being considered to more efficiently handle increasing data flow across the internet. OCS based smart patch panels enable dynamic modification of data center network topologies rather than a predetermined static topology. Because of the dynamic nature of OCS's, optical port connections at an OCS may continually change such that no single static topology exists that can be used to verify all connections in the data center. Furthermore, fiber-optic cables have a transmit end and receive end that must be correctly connected to an OCS to send or receive data. Accordingly, a method of detecting cabling errors in the dynamic topology of an OCS data center is desired.

SUMMARY OF THE DISCLOSED EMBODIMENTS

According to one example embodiment, a method of verifying the polarity of optical fibers connected to optical ports of an optical circuit switch are disclosed. The method includes performing a first round of a port verification process on at least two optical ports wherein the port verification process includes optically connecting the at least two optical ports on an optical circuit switch, transmitting a payload from at least one optical port in the at least two optical ports, determining if the payload was received at a second optical port in the at least two optical ports, assigning a pair of ports to a first group in the case that the predetermined payload was communicated between the pair of ports, and assigning a pair of ports to a second group in the case that the predetermined payload was not communicated between the pair of ports. The method also includes performing additional rounds of the port verification process until a predetermined selection of the optical ports on the optical circuit switch are assigned to the first group or the second group and determining that either the first group of ports or the second group of ports has inverted polarity.

According to another example embodiment, a computer-readable medium comprising instructions which, when executed by at least one processing circuit performs a method of port verification. The method of port verification includes performing a first round of a port verification process on at least two optical ports that includes optically connecting the at least two optical ports on an optical circuit switch, transmitting a payload from at least one optical port in the at least two optical ports, determining if the payload was received at a second optical port in the at least two optical ports, assigning a pair of ports to a first group in the case that the predetermined payload was communicated between the pair of ports, and assigning a pair of ports to a second group in the case that the predetermined payload was not communicated between the pair of ports.

According to yet another example embodiment, a system for verifying polarity of optical fibers connected to optical ports of an optical circuit switch is disclosed. The system includes at least one memory and at least one processor configured to execute a computer program stored in the at least one memory to optically connect at least two optical ports on an optical circuit switch, transmit a payload from at least one optical port in the at least two optical ports, determine if the payload was received at least a second optical port in the at least two optical ports, assign a pair of ports to a first group in the case that the predetermined payload was communicated between the pair of ports, assign a pair of ports to a second group in the case that the predetermined payload was not communicated between the pair of ports, and determine that either the first group of ports or the second group of ports has inverted polarity.

BRIEF DESCRIPTION OF THE DRAWINGS

Illustrative embodiments are hereinafter described, wherein like reference numerals refer to like elements, in which.

DETAILED DESCRIPTION OF THE ILLUSTRATIVE EMBODIMENTS

Before describing in detail the particular improved system and method, it should be observed that the several disclosed embodiments include, but are not limited to a structural combination of conventional data/signal processing components and communications circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the disclosed embodiments are not limited to the particular embodiments depicted in the example diagrams, but should be construed in accordance with the language in the claims.

Figure 1:
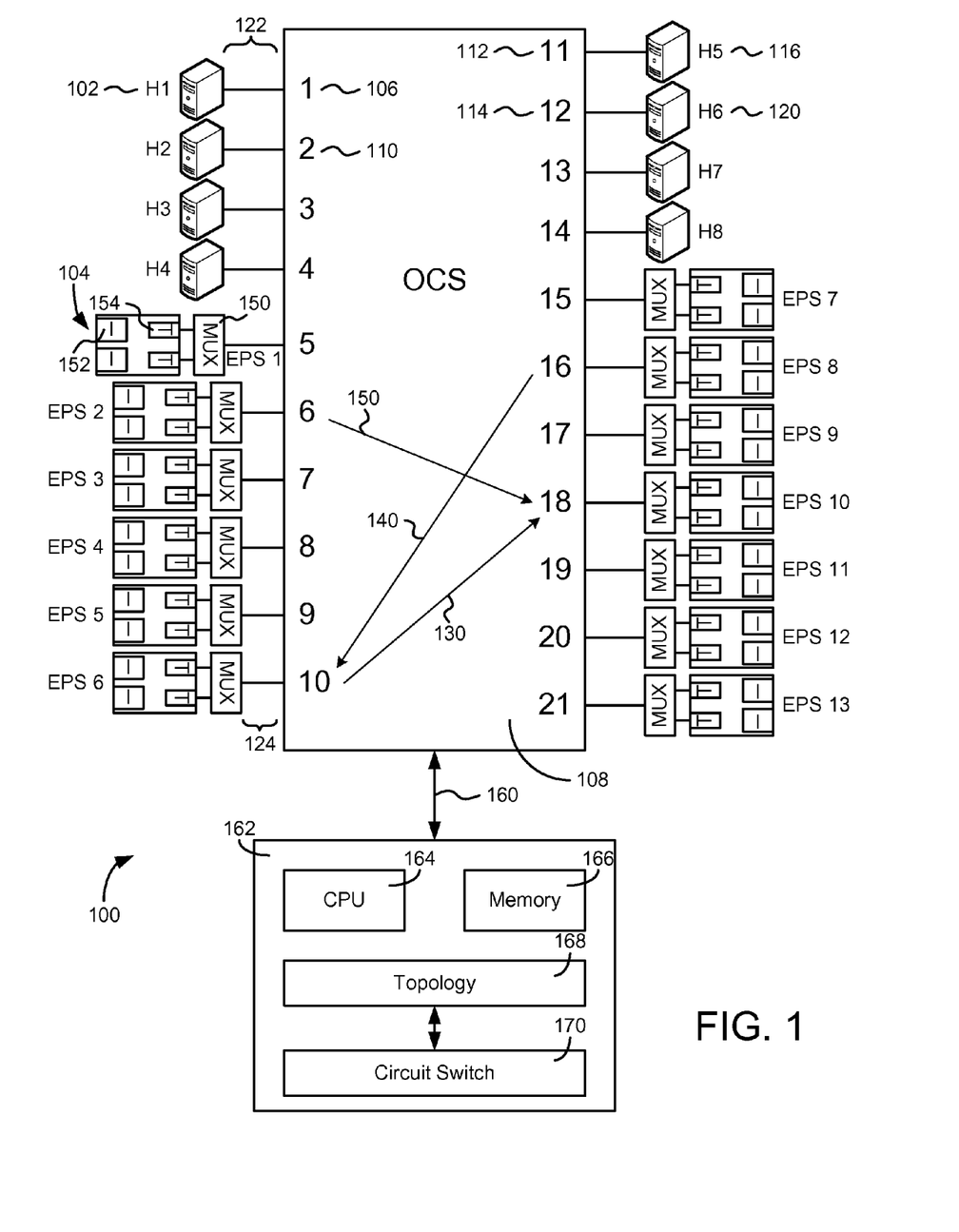
FIG. 1 is a block diagram of an OCS connected to electrical packet switches and hosts according to one illustrative embodiment.

Referring to FIG. 1, an OCS 108 is shown. The OCS may be part of a data center that provides host to host, EPS to host, host to EPS, EPS to EPS, or OCS to OCS data connectivity, for example. OCS 108 may provide and alter dynamic optical link connections between OCS ports 1-21 using micro-electromechanical systems (MEMS), for example. According to one illustrative embodiment, OCS 108 uses a crossbar of electrically controlled mirrors to direct a beam of light from any input port to any output port. For example, circuit switch manager 162 may direct the MEMS in OCS 108 to transmit optical link 150 from EPS port 6 to EPS port 18, for example. The MEMS mirrors may be attached to miniature motors which are controlled by circuit switch manager 162, for example. Circuit switch manager 162 may determine MEMS positions through the miniature motors according to a particular connection matrix stored and updated in memory 166 and communicated to OCS 108 via communication link 160, for example.

The optical connection topology or connection matrix may be determined by a topology software module 168, according to one embodiment. Topology module 168 may monitor real time communication patterns, estimate network traffic, and calculate new topologies or OCS configurations based on traffic data and traffic calculations. The results of determinations made at topology module 168 may be translated into circuit switch commands at circuit switch module 170. These circuit switch commands may then be communicated to OCS 108 through communication link 160. Furthermore, although shown as a distinct entity in FIG. 1, circuit switch manager 162 may be embedded in OCS 108 or may be coupled to several different OCS patch panels to provide circuit switching commands. Additionally, circuit switch manager 162 may reside on one or multiple servers according to some additional embodiments.

Figure 5:
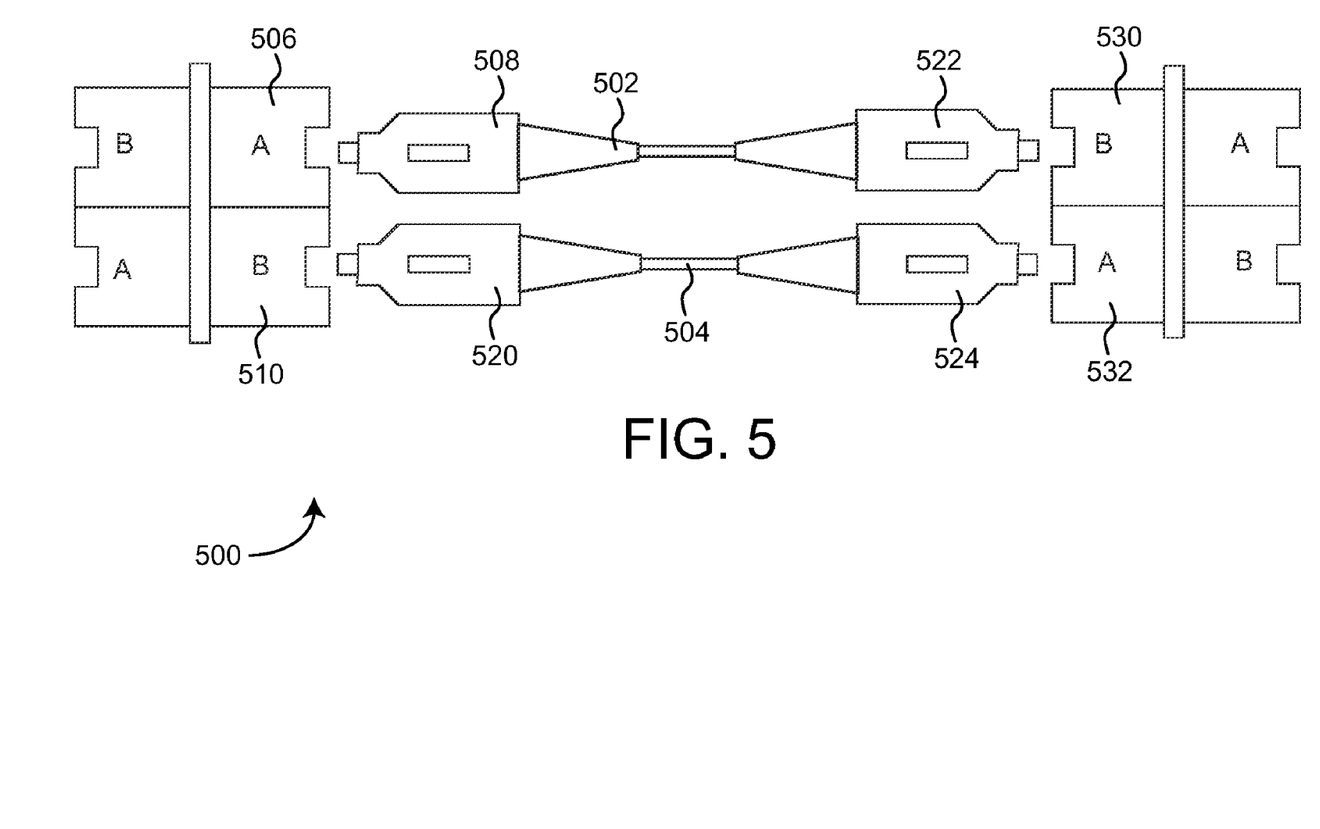
FIG. 5 is a schematic diagram of optical fibers, optical fiber connectors, and optical ports, according to one illustrative embodiment.

Referring again to FIG. 1, hosts 102 such as servers or EPS's 104 may be operably connected to OCS 108 by fiber optic cables 122 and 124. The fiber optic cables may include a single optical fiber carrying bidirectional optical communication links or multiple optical fibers each carrying unidirectional transmit or receive optical communication links. In one illustrative embodiment, optical link 122 connecting host 102 and OCS 108 is a carried in a fiber optic cable 502 or 504 as shown in FIG. 5. For example, fiber optic cable 502 may include an optical fiber with connectors 508 and 522 used to connect with outlets 506 and 530. Outlet 506 may be placed on the exterior of an OCS housing unit and may correspond to a single OCS optical port, such as optical port 1, for example. Outlet 530 may be placed on the outer housing of a host 102, for example. Although the embodiment shown in FIG. 5 depicts separate optical cables 502 and 504 for transmitting and receiving and separate transmit 506, 532 (marked "A") and receive 510, 530 (marked "B") outlets, these separate cables and outlets may be combined into a single optical cable or outlet.

Furthermore, failing to install fiber optic cables 502, 504 into the various OCS ports 1-21 with the correct polarity may cause OCS 108 to fail in sending and receiving optical data between optical ports. Many fiber optic cables such as cable 502 have a transmit side with a transmit connector 522 that must be mated with a transmit outlet 530 in order to have correct polarity and carry optical data. As shown in FIG. 5, the fiber optic cable 502 is installed with the correct polarity. However, if fiber optic cable 502, for example, was installed such that transmit connector 502 was mated with receive outlet 506, the fiber optic cable connection would have inverse polarity.

Installing cables with inverse polarity can lead to an inability to receive and transmit optical data. For example, if an OCS port such as port 6 is connected to a fiber optic cable that has inverted polarity and OCS port 6 has been mapped by circuit switch manager 162 to transmit to OCS port 18, the transmission will fail if OCS port 18 is connected to a fiber optic cable with correct polarity. However, if two OCS ports in communication such as OCS port 6 and OCS port 18 are both connected to fiber optic cables with inverted polarities, an optical link 150 may still be established. Accordingly, there is no correct or incorrect convention that must be adhered to in order to optically communicate between OCS ports.

Figure 6:
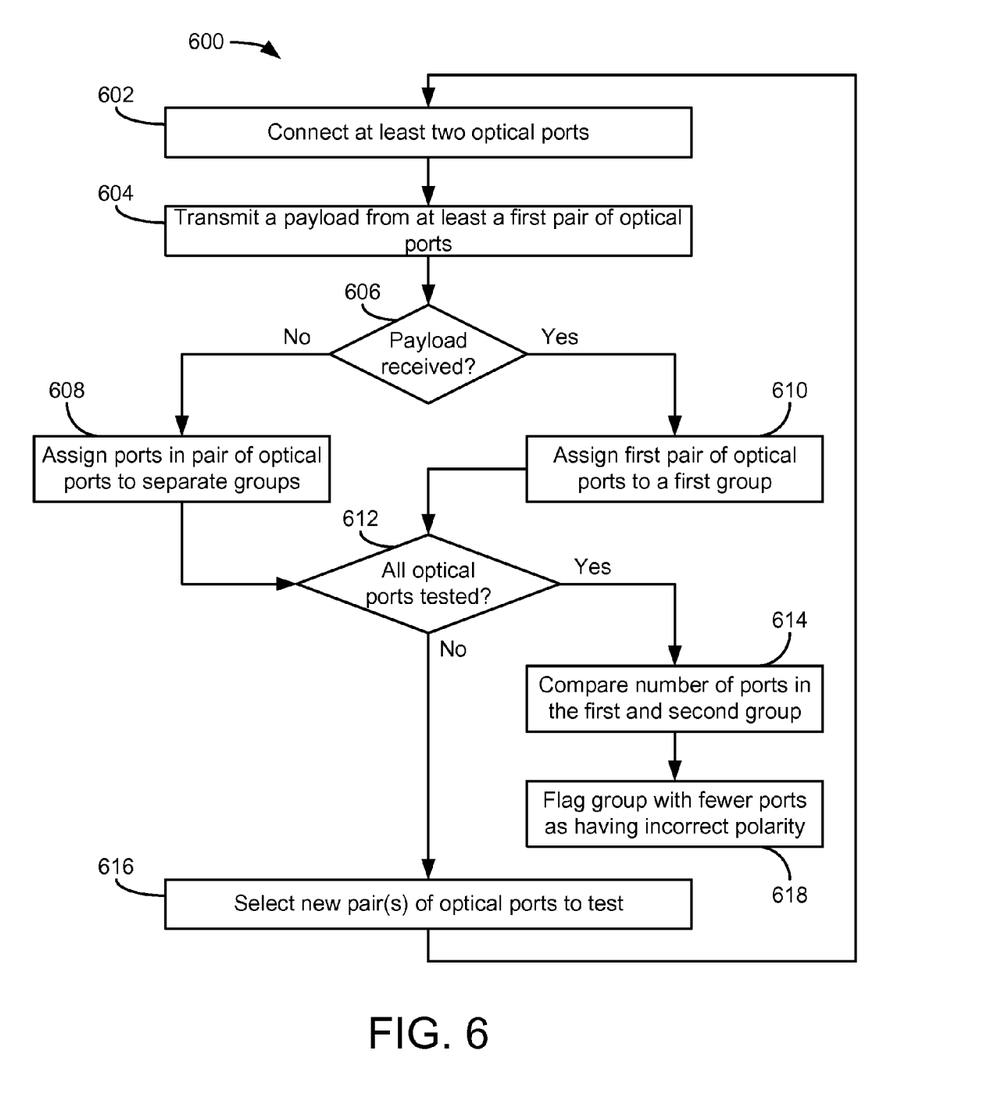
FIG. 6 is a flow chart depicting a process of detecting OCS optical port connection errors according to one illustrative embodiment.

One method of determining if there is polarity inversion that leads to a loss of optical connection at an OCS is shown by process 600 in FIG. 6. Process 600 may be implemented as software code stored in memory 166 and executed by processor 164, according to one illustrative embodiment. Process 600 may also be implemented in the memory of the OCS 108 itself or implemented in the memory of a portable testing unit temporarily coupled to OCS 108 for connection testing purposes. Process 600 may take place after initial installation and set up of OCS 108 and fiber connections 122 and 124 prior to initial use of the OCS in a data center application, for example. Process 600 may also be used in periodic systems testing after the initial use of the OCS in a data center application.

As stated previously, there is no predetermined optical link topology within OCS 108 that can be used as a reference for testing each optical connection (such as an optical connection from OCS port 15 to OCS port 10, for example, as shown in FIG. 1) to ensure that data can be transmitted at all points of the topology without a fault. For example, in prior art systems, a predetermined topology could be tested by transmitting a packet at a known transmission point and determining if the packet is received at various points in the known topology. In OCS 108, however, any given OCS optical port may transmit or receive data from any other OCS port. Accordingly, OCS 108 has a large volume of optical connection combinations that must be tested to determine if any inverted fiber optic cables 122, 124 coupled to OCS 108 will prevent optical data transmission.

Referring again to process 600, at block 602, process 600 optically connects at least two optical ports. Accordingly, at block 602, a single OCS port such as OCS port 1 may be optically connected to another single OCS port, such as OCS port 11. Furthermore, block 602 may connect at least 4, at least 6, or more optical ports according to additional embodiments. The optical ports to be optically connected may be selected by topology software module 168 in circuit switch manager 162. OCS ports 1-21 may include transmit and receive components such that all OCS ports are capable of transmitting and receiving optical data links such as 130, 140 and 160. At block 604 of process 600, a known payload may be transmitted between the OCS ports selected in block 602. According to one embodiment, block 604 injects a known payload such as a verification data packet from an EPS port such as EPS 16, for example, to another EPS port such as EPS 6, for example. The verification data packet may be an address resolution protocol (ARP) request or an internet control message protocol (ICMP) echo request, according to one embodiment. At block 606, it is determined if the known payload transmitted from a first OCS port is received at a second OCS port selected at block 602. The circuit switch manager 162, for example, may receive an indication the known payload is received from communication link 160 as shown in FIG. 1.

If the payload is received at block 606, process 600 assigns the pair of OCS ports to a first group. The first group may be a predetermined location in memory 166, for example. The pair of OCS ports are assigned to the same group because a successful transmission means that the ports are connected with fiber optic cables that have the same polarity. However, if the payload is not received at block 606, this indicates that the pair of tested OCS ports are connected with fiber optic cables that have opposite polarity. In this case, the ports are placed into a second group at block 608. According to one embodiment, each port may be sent to either the first or second group. At block 612 process 600 determines if all ports, such as ports 1-21 of OCS 108 have been assigned to a first or second group. Block 612 may determine if a predetermined selection of the optical ports on the optical circuit switch have been assigned to a first or second group. The predetermined selection may be all ports on an OCS or a subset of all ports on an OCS. The predetermined selection may be identified by a control signal sent to circuit switch manager 162, for example. If any OCS ports or any of the predetermined selection of OCS ports have not been selected and placed into a first or second group, new pairs of optical ports are selected at block 616. According to one embodiment, each additional round of OCS optical port verification initiated by block 616 doubles the number of ports selected at block 602 compared with the previous round. For example, if two ports were selected at block 602 in a first round of OCS port verification, four ports will be selected at block 612 at the initiation of the second round of OCS optical port verification, according to one embodiment.

However, if each of the OCS optical ports have been assigned to a first or second group, then the number of OCS optical ports assigned to each group is compared at block 614. According to one embodiment, the number of ports tested for polarity determines the number of rounds required to complete the port verification process. For example, the port verification process may be carried out by a computer program stored in memory 166 and executed by a processing device 164 such that for n total OCS optical ports, the port verification process terminates in approximately O(log n) rounds.

The group with the lesser number of ports is flagged as having incorrect polarity at block 618. Block 618 may also or alternatively flag the group with the greater number of ports as having correct polarity. The flagging may be performed by a computer program stored in at least one memory of circuit switch manager 162, for example. Flagging may include setting a bit or bits in memory, providing an alert or displayable item to a user, highlighting to a user, storing an indication, or embedding a code, for example. Once the group with fewer ports has been flagged as having incorrect polarity, port identifiers associated with OCS ports that have been flagged as having incorrect polarity may be stored as a list in memory 166. The port identifiers may further be translated into display data for display to a user in order to reconfigure the optical fiber links connected to OCS 108 that have incorrect polarity. For example, the optical fiber links may be manually reconfigured by disconnecting the optical fiber link and reversing the connector ends 508 and 522.

One example of process 600 is shown in Table (1) below. Table (1) depicts the results of performing process 600 on an OCS with four optical ports. Each OCS port includes both a transmit ("B") and receive ("A") component. The transmit component is noted as 1 and the receive component is noted as a 2 for each port in Table (1). Accordingly, the four OCS optical ports transmit and receive components are denoted as 1/1, 1/2, 1/3, 1/4, 2/1, 2/2, 2/3 and 2/4. In the example shown in Table (1), the ports are classified into one of two groups, Group 1 and Group 2. All the ports in a given group have either been determined to have the same polarity, or have not been confirmed as having opposite polarity. Table (1) shows each round of process 600, whether each optical connection between two ports that was tested resulted in a received packet in each round, and what group the optical ports have been assigned to as a result of each round of testing.

TABLE 1

| ROUND | connections tested | Packet Received? | Group 1/Group 2 count |
|---|---|---|---|
| 1 | (1) Connect 1/1 and 1/2 | YES | Group 1: 1/1 and 1/2 Group 2: Empty |
| 2 | (2) Connect 1/1 to 1/3 | NO | Group 1: 1/1, 1/2, 1/4 |
|   | Connect 1/2 to 1/4 | YES | Group 2: 1/3 |
| 3 | (4) Connect 1/1 and 2/1 | YES | Group 1: 1/1, 1/2, 1/4, |
|   | Connect 1/2 and 2/2 | YES | 2/1, 2/2, 2/3, 2/4 |
|   | Connect 1/3 and 2/4 | YES | Group 2: 1/3 |
|   | Connect 1/4 and 2/4 | YES |   |

As seen in Table (1), each round of optical connection testing doubled the number of ports tested. Furthermore, in each round, a port already assigned to a group was tested with a port that was not yet assigned to a group. As seen in Table (1) a packet was received for all OCS optical port connections with the exception of the connection tested between OCS port 1 and OCS port 3. Accordingly, as per block 608 in FIG. 6, OCS port 1 and OCS port 3 were assigned to separate groups. Once it is determined at block 612 that testing such as the testing shown in Table (1) has been completed for all optical ports in the OCS, the number of ports in each group are compared. Here, Group 1 included a greater number of ports than Group 2 after all ports had been tested according to process 600.

According to one example, Group 2 will be flagged as having incorrect polarity at block 618 by a software program with instructions performing process 600. The list of ports indicated as having incorrect polarity can then be stored, communicated or displayed to facilitate reconfiguration of the list of ports determined to have incorrect polarity by process 600. For example, based on the results shown in FIG. 1, a transmit portion of port 3 (1/3) is determined to have incorrect polarity. Once this polarity determination is communicated to a user, e.g., via displaying the incorrect polarities on a display in communication with CPU 164 (FIG. 1), the fiber optic link connected to port 3 can be reversed, according to one embodiment, in order to correct transmission errors due to polarity inversion. According to one embodiment, an optical fiber link such as link 502 can be reversed by unplugging connector 522 from port 530, unplugging connector 508 from port 506, and inserting connector 522 into port 506 while also inserting connector 508 into port 530.

Figure 4:
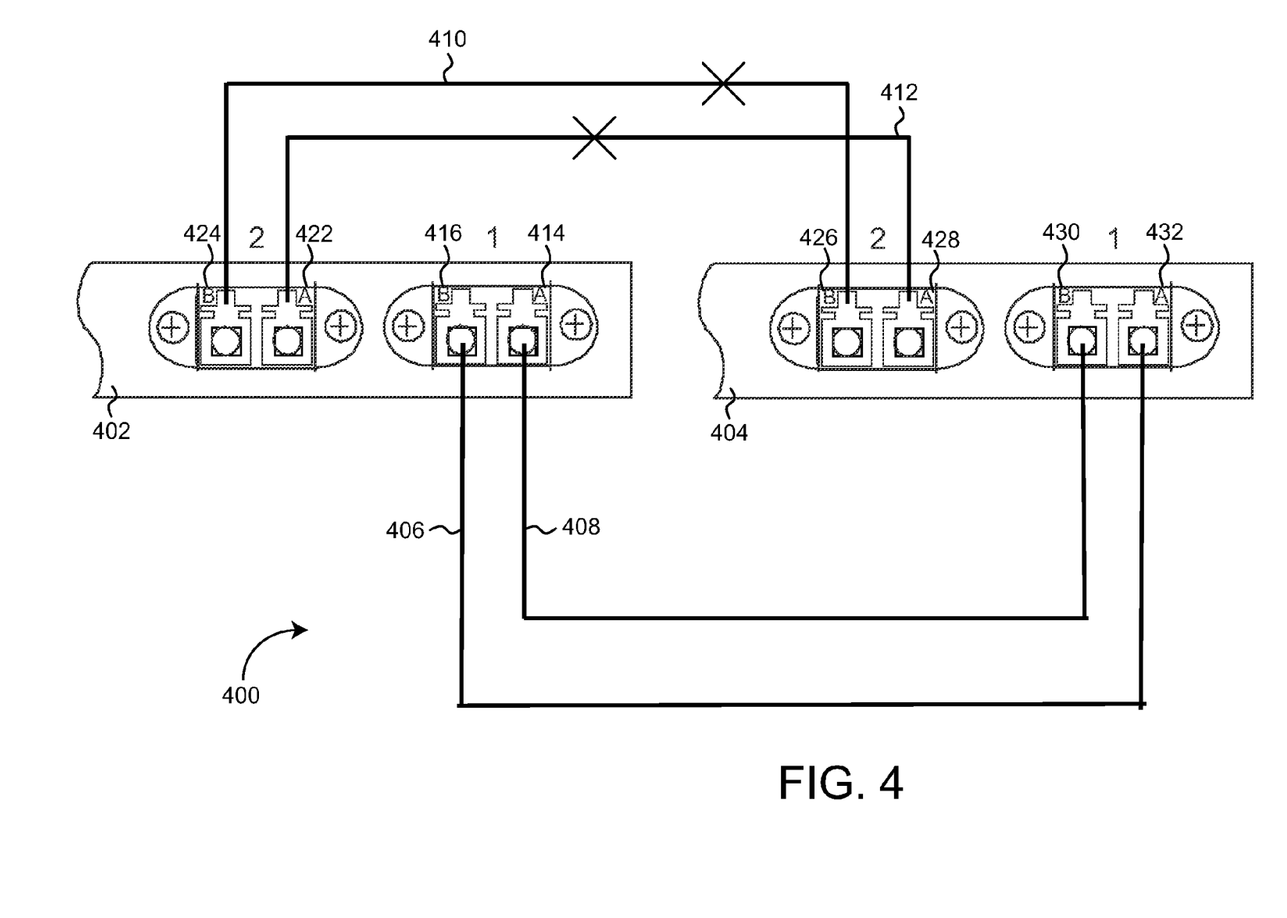
FIG. 4 is a schematic diagram depicting optical fiber line connections with correct and incorrect polarity according to one illustrative embodiment.

FIG. 4 depicts a schematic diagram of a correct and incorrect fiber optic link installation. Element 404 represents the exterior of an OCS patch panel according to one embodiment. Elements 430 and 432 represent transmit and receive components of OCS port 1, and elements 430 and 432 constitute connection 1/1 and 2/1 included in table 1 above, for example. Furthermore, element 402 represents the exterior of a host or EPS functionally connected to OCS 108. As seen in FIG. 4, port 414 is a receiver port (denoted by "A"), that is connected by fiber optic link 408 to port 430, a transmit port (denoted by "B"). According to one embodiment, because a transmit port is linked to a receiver port, link 408 can be considered to have correct polarity that can be tested according to process 600.

Fiber optic link 412 provides one example of how an optical fiber can result in an incorrect polarity determination, such as port connection 1/3 shown in Table (1). Incorrect polarity may result when a transmit port is connected to a receive port. In FIG. 4, elements 426 and 428 represent components of OCS port 3, for example. Here, optical fiber 412 connects port 422, a receiver port (denoted by "A") to another receiver port 428 (denoted by "A"). Such a connection of ports can lead to a lack of ability to transmit to and from OCS 108 depending on whether the optical port being optically linked to within OCS 108 also has incorrect polarity.

Figure 2:
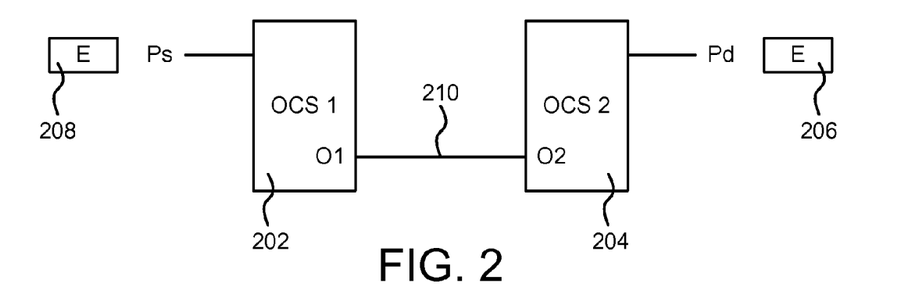
FIG. 2 is a block diagram of two OCS units optically linked according to one illustrative embodiment.
Figure 3A:
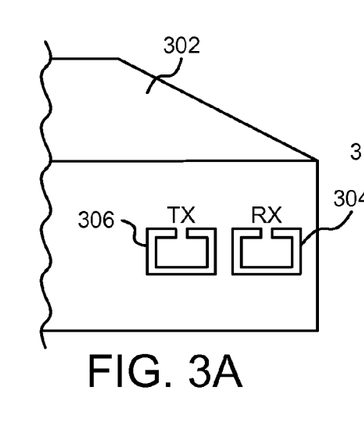
FIG. 3A is a depiction of transmit and receive portions of an optical port connection according to one illustrative embodiment.
Figure 3B:
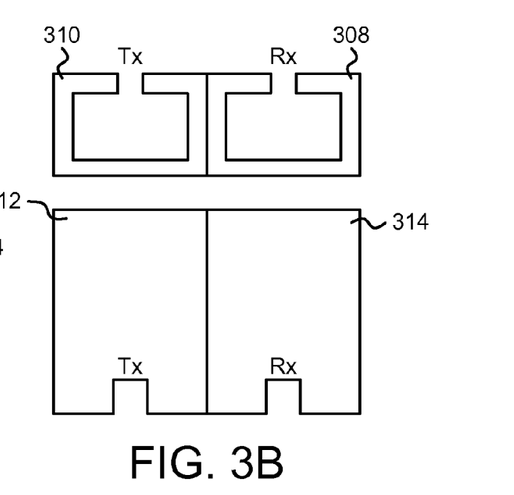
FIG. 3B is a depiction of a top view and a front view of an optical port connection according to one illustrative embodiment.

In addition to performing process 600 on EPS and Host connections to an OCS 108, process 600 may also be applied to OCS to OCS connections, such as connection 210 as shown in FIG. 2, for example. OCS to OCS connections may be used in data centers implementing multistage circuit switching networks, such as Clos networks. Process 600 may be performed on OCS network 200 after fiber optic connections between EPS ports 206 and 208 and the fiber optic connections between OCS 204 and OCS 202 are completed. To test the polarity of OCS to OCS connections, such as connection 210, it may be necessary to first determine that Ps and Pd are two EPS ports with correct polarity.

In addition, with respect to OCS manager 162, the one or more computers such as CPU 162 may comprise one or more processors, that in some embodiments, may be coupled with a bus, and may be configured to process and handle information and execute instructions. A main memory 166, which may be a Random Access Memory (RAM) or other dynamic storage device, may be coupled to the bus, for storing information and instructions to be executed by the one or more processors. The main memory also may be used for storing temporary variables or other intermediate information during execution of instructions by the one or more processors. The one or more processors may be configured for executing one or more sequences of computer-readable instructions contained in the main memory. Such instructions may be read into the main memory from another computer-readable medium, such as a ROM, or other storage device. Execution of the sequences of instructions contained in the main memory will cause the one or more processors to perform the process blocks described herein. It should be appreciated that embodiments may perform fewer or additional processes as compared to those described herein. As noted, the one or more processors may be arranged in a multi-processing arrangement. Alternatively, hard-wired circuitry may be used in place of or in combination with software instructions to implement the invention. Thus, embodiments of the invention are not limited to any specific combination of hardware circuitry and software.

It should be noted that the server is illustrated and discussed herein as having various modules which perform particular functions and interact with one another. It should be understood that these modules are merely segregated based on their function for the sake of description and represent computer hardware, circuits and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein.

The above-described embodiments can be implemented using hardware, software or a combination thereof. When implemented in software, the software code can be executed on any suitable processor or collection of processors, whether provided in a single computer system ("computer") or distributed among multiple computers.

Further, it should be appreciated that a computer may be embodied in any of a number of forms, such as a rack-mounted computer, a desktop computer, a laptop computer, a server computer, a cloud-based computing environment, a tablet computer, etc. Additionally, a computer may be embedded in a device with suitable processing capabilities, including a Personal Digital Assistant (PDA), a smart phone or any other suitable portable or fixed electronic device.

The various methods or processes outlined herein may be coded and executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. The recitation of a module, logic, unit, or circuit configured to perform a function includes discrete electronic and/or programmed microprocessor portions configured to carry out the functions. For example, different modules or unit that perform functions may be embodied as portions of memory and/or a microprocessor programmed to perform the functions.

Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

What is claimed is:

1. A method of verifying polarity of fiber optic cables connected to optical ports of an optical circuit switch comprising:
performing a first round of a port verification process on at least two optical ports wherein the port verification process comprises:
optically connecting the at least two optical ports on an optical circuit switch;
transmitting a payload from at least one optical port in the at least two optical ports;
determining if the payload was received at a second optical port in the at least two optical ports;
assigning the at least two optical ports to a first group in the case that the predetermined payload was communicated between the at least two optical ports; and
assigning the at least two optical ports to a second group in the case that the predetermined payload was not communicated between the at least two optical ports;
performing additional rounds of the port verification process until a predetermined number of pairs of optical ports on the optical circuit switch are assigned to the first group or the second group; and
determining that the first group of ports or the second group of ports has inverted polarity.

2. The method of claim 1, wherein for each additional round, the payload is transmitted between an optical port that has been assigned to the first group or the second group and an optical port that has not been assigned to either the first group and the second group.

3. The method of claim 1, wherein determining that the first group of ports or the second group of ports has inverted polarity comprises:
determining the number of ports in the first group;
determining the number of ports in the second group;
comparing the number of ports in the first group with the number of ports in the second group; and
flagging the group with the fewer number of ports as having inverted polarity.

4. The method of claim 1, wherein each successive round of the port verification process doubles the number of ports included in the port verification process compared with the previous round of the port verification process.

5. The method of claim 1, wherein the group with the greater number of ports is determined to have correct polarity.

6. The method of claim 1, wherein port identifiers of the ports in the group determined to have inverted polarity are identified and stored in a memory.

7. The method of claim 1, further comprising transmitting display data representing the ports determined to have inverted polarity to a user.

8. The method of claim 1, wherein at least one of the ports determined to have incorrect polarity and optical fibers associated with at least one of the ports determined to have inverted polarity are subsequently reconfigured.

9. The method of claim 8, wherein the ports determined to have inverted polarity are reconfigured manually.

10. The method of claim 1, wherein the port verification process is carried out by a computer program executed by a processing device such that for n ports, the port verification process terminates in approximately O(log n) rounds.

11. The method of claim 1, wherein each of the optical ports in the optical circuit switch transmit and receive data using MEMS devices.

12. The method of claim 1, wherein prior to the verification process, optical ports on the OCS do not have a predetermined topology.

13. The method of claim 1, wherein the ports comprise electrical packet switching ports and host ports.

14. A computer-readable medium comprising instructions which, when executed by at least one processing circuit, comprise:
performing a first round of a port verification process on at least two optical ports wherein the port verification process comprises:
optically connecting the at least two optical ports on an optical circuit switch;
transmitting a payload from at least one optical port in the at least two optical ports;
determining if the payload was received at a second optical port in the at least two optical ports;
assigning the at least two optical ports to a first group in the case that the predetermined payload was communicated between the at least two optical ports; and
assigning the at least two optical ports to a second group in the case that the predetermined payload was not communicated between the at least two optical ports;
performing additional rounds of the port verification process until a predetermined number of pairs of optical ports on the optical circuit switch are assigned to the first group or the second group; and
determining that the first group of ports or the second group of ports has inverted polarity.

15. The computer-readable medium of claim 14, wherein for each additional round, the payload is transmitted between an optical port that has been assigned to the first group or the second group and an optical port that has not been assigned to either the first group and the second group.

16. The computer-readable medium of claim 14, wherein determining that the first group of ports or the second group of ports has inverted polarity comprises:
determining the number of ports in the first group;
determining the number of ports in the second group;
comparing the number of ports in the first group with the number of ports in the second group; and
flagging the group with the fewer number of ports as having inverted polarity.

17. The computer-readable medium of claim 14, wherein each successive round of the port verification process doubles the number of ports included in the port verification process compared with the previous round of the port verification process.

18. The computer-readable medium of claim 14, wherein the group with the greater number of ports is flagged as having correct polarity and the group with the fewer number of ports is flagged as having inverted polarity.

19. The computer-readable medium of claim 14, wherein at least one of the ports determined to have inverted polarity and optical fibers associated with at least one of the ports determined to have inverted polarity the are reconfigured.

20. A system for verifying polarity of optical fibers connected to optical ports of an optical circuit switch comprising:
at least one memory; and
at least one processor configured to execute a computer program stored in the at least one memory to perform a port verification process comprising:
optically connecting at least two optical ports on an optical circuit switch;
transmitting a payload from at least one optical port in the at least two optical ports;
determining if the payload was received at least a second optical port in the at least two optical ports;

assigning the at least two optical ports to a first group in the case that the predetermined payload was communicated between the pair of ports;

assigning the at least two optical ports to a second group in the case that the predetermined payload was not communicated between the pair of ports;

performing additional rounds of the port verification process until a predetermined number of pairs of optical ports on the optical circuit switch are assigned to the first group or the second group; and determining that the first group of ports or the second group of ports has inverted polarity.

21. The system of claim 20, wherein the at least one processor executing a computer program stored in the at least one memory is further configured to:

determine the number of ports in the first group;

determine the number of ports in the second group;

compare the number of ports in the first group with the number of ports in the second group; and flag the group with the fewer number of ports as having inverted polarity.

22. The system of claim 21, wherein the group with the greater number of ports is determined to have correct polarity.

* * * * *